United States Patent
Pan et al.

(10) Patent No.: US 7,643,103 B2
(45) Date of Patent: Jan. 5, 2010

(54) BACKLIGHT MODULE HAVING THROUGH HOLE WITH HEAT CONDUCTIVE METAL PLATE THEREIN AND LIQUID CRYSTAL DISPLAY INCLUDING THE SAME

(75) Inventors: Chih-Liang Pan, Hsin-Chu (TW); Chun-Yen Chang, Hsin-Chu (TW); Han-Chang Cheng, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 144 days.

(21) Appl. No.: 11/751,072

(22) Filed: May 21, 2007

(65) Prior Publication Data
US 2007/0268724 A1 Nov. 22, 2007

(30) Foreign Application Priority Data
May 22, 2006 (TW) ............... 95118138 A
Apr. 26, 2007 (TW) ............... 96114835 A

(51) Int. Cl.
*G02F 1/1333* (2006.01)
(52) U.S. Cl. ............... 349/58; 349/59; 349/161
(58) Field of Classification Search ............ 349/58–60, 349/150, 161
See application file for complete search history.

(56) References Cited

U.S. PATENT DOCUMENTS

| | | | | |
|---|---|---|---|---|
| 6,407,781 B2 * | 6/2002 | Kitada | ............ | 349/58 |
| 6,835,961 B2 * | 12/2004 | Fukayama | ............ | 257/84 |
| 6,847,416 B2 | 1/2005 | Lee et al. | | |
| 6,970,226 B2 | 11/2005 | Yu et al. | | |
| 2001/0043297 A1 * | 11/2001 | Arai | ............ | 349/114 |
| 2005/0052588 A1 * | 3/2005 | Saito et al. | ............ | 349/58 |

* cited by examiner

*Primary Examiner*—Andrew Schechter
*Assistant Examiner*—Michael Inadomi
(74) *Attorney, Agent, or Firm*—Thomas, Kayden, Horstemeyer & Risley

(57) ABSTRACT

A backlight module and a liquid crystal display (LCD) both have a heat conductive structure for reducing the non-uniformity phenomenon of display. The backlight module comprises a frame, a reflective sheet, a heat-conductive plate, and a circuit board, wherein the frame has a bottom portion and at least one substantially step-typed through hole is formed therein. The reflective sheet is disposed on the inner surface of the bottom portion, and the heat-conductive plate is disposed in the step-typed through hole, and is spaced from the reflection sheet at a predetermined distance. The circuit board is disposed on the outer surface of the bottom portion of the frame, and has at least one electrical component that is received in the substantially step-typed through hole.

36 Claims, 6 Drawing Sheets

BACKLIGHT MODULE HAVING THROUGH HOLE WITH HEAT CONDUCTIVE METAL PLATE THEREIN AND LIQUID CRYSTAL DISPLAY INCLUDING THE SAME

RELATED APPLICATIONS

This application claims the benefits of Taiwan Patent Application No. 95118138, filed May 22, 2006 and Taiwan Application No. 96114835, filed Apr. 26, 2007, the contents of which are herein incorporated by reference in its entirety.

BACKGROUND

2. Field of Invention

The present invention relates to a backlight module and a liquid crystal display (LCD) including the same, and more particularly, to a backlight module having a heat conductive structure so as to reducing the non-uniformity phenomenon of display and liquid crystal display including thereof.

2. Description of Related Art

During data processing, an integrated circuit (IC) usually generates heat, and thus it has been quite an important factor for the design of electrical module regarding how to enhance the heat-dissipation design to increase the heat-dissipation efficacy, particularly in LCD industries. Since the data displaying speed is increasing daily, and the limitation of size (particularly for notebook computers) results in a very short distance between electrical components and optical elements in a LCD module, the high heat generated from the electrical components will affect locally the optical performance of an optical film of a backlight module, a light guide plate or liquid crystals in an array/cell.

With respect to a twisted nematic liquid crystal display (TN LCD), its transmittance shows a relationship of negative temperature coefficient with the change of temperature, i.e. the higher the temperature is, the lower the transmittance becomes. In addition, when the conditions between the LC cell and liquid crystals are different, the change of the transmittance will become more significant, thus making the phenomenon of transmittance lowered with increasing temperature more apparent.

In a LCD module, under certain display patterns requiring bigger loads, the electrical components on a printed circuit board (PCB) will cause the phenomenon of high temperature, wherein the temperature thereof can be more than 60° C. On the products having stricter requirements on the module size, such as a liquid crystal panel model of a notebook computer, a PCB is folded and fixed on a backlight module while in assembly, and for further saving space, electrical components on the PCB are disposed inwards and spaced from a reflection sheet at quite a small distance. Under this situation, when the heat generated from the electrical components is concentrated in the apparatus without any design of heat insulation or heat conduction, the liquid crystals therein will be caused to have the phenomenon of local high temperature, thus resulting in the local non-uniformity of display.

A conventional method for overcoming the aforementioned problem is to attach a heat-conductive metal plate on the back of the reflection sheet for uniformly distributing the high heat generated by the electrical components, thereby preventing the local transmittance of LC cell from being lowered by the heat concentrated on one certain point. However, due to the different heat expansion coefficients between the heat conductive plate and the reflection sheet, the heat-conductive plate directly attached to the reflection sheet will result in the local non-uniformity of display, and the heat-conductive plate attached will also cause the generation of a visible fringe or dark area of the display around the edge thereof, thus resulting in apparent bright lines shown on the display.

SUMMARY

Hence, an aspect of the present invention is to provide a backlight module and a LCD including the same for reducing the non-uniformity phenomenon of display by using a proper heat-conductive structure.

An embodiment of a backlight module comprises a frame, a reflective sheet, a first heat conductive plate, and a first circuit board. The frame has a bottom portion and a first substantially step-typed through hole formed in the bottom portion. The reflective sheet is disposed on the inner surface of the bottom portion. The first heat conductive plate is disposed in the first substantially step-typed through hole, wherein the first heat conductive plate is spaced from the reflective sheet at a predetermined distance. The first circuit board is disposed on the outer surface of a portion of the bottom portion, and has at least one first electrical component received in the first substantially step-typed through hole.

An embodiment of a LCD comprises the aforementioned backlight module, a light guide plate adjoining to the aforementioned reflective sheet, at least one optical film disposed on the light guide plate, and a liquid crystal panel disposed on the optical film.

Another embodiment of a backlight module comprises a frame, a reflective sheet, and at least one first circuit board. The frame has a bottom portion and a plurality of first through holes formed in the bottom portion. The reflective sheet is disposed on the inner surface of the bottom portion. The first heat conductive plate is disposed in one of the first through holes, wherein the first heat conductive plate is spaced from the reflective sheet at a predetermined distance. The first circuit board is disposed on the outer surface of a portion of the bottom portion, and has at least one first electrical component received in at least one of the first through holes.

Further, the present invention provides an electro-optical apparatus comprising one of the aforementioned backlight modules or the aforementioned LCD.

It is to be understood that both the foregoing general description and the following detailed description are examples, and are intended to provide further explanation of the present invention as claimed.

BRIEF DESCRIPTION OF THE DRAWINGS

The present invention will become more fully understood from the detailed description given herein below and the accompanying drawings, given by way of illustration only and thus not intended to be limitative of the present invention.

DESCRIPTION OF THE PREFERRED EMBODIMENTS

Figure 1:
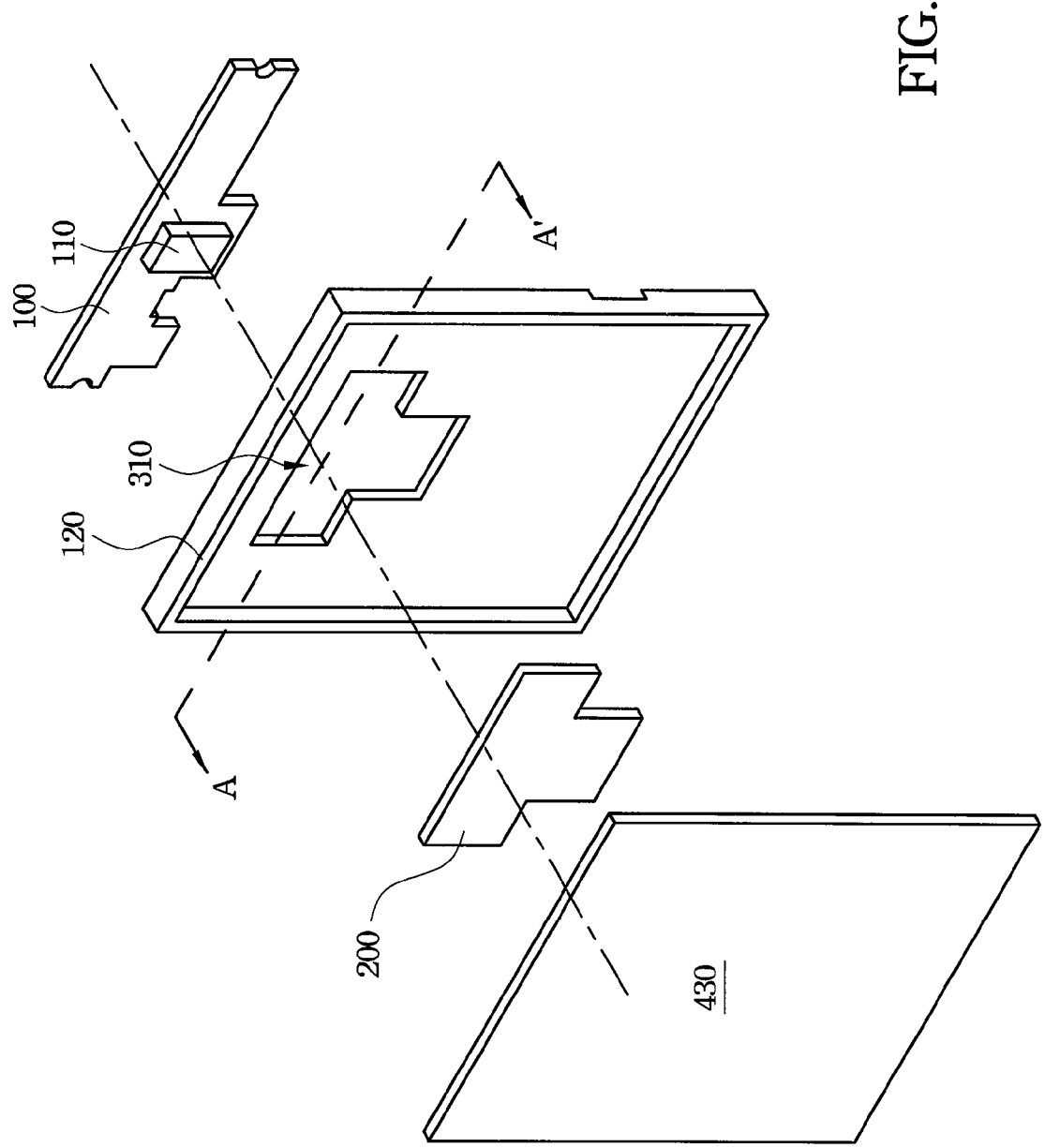
FIG. 1 is a schematic explosive diagram illustrating a LCD according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a schematic explosive diagram illustrating a LCD according to an embodiment of the present invention, wherein the type of the substantially step-typed though hole is not specified. The LCD comprises a circuit board 100, a frame 120, a heat conductive plate 200, and a liquid crystal display unit 430 (also referred to as a liquid crystal display panel), wherein at least one through hole 310 (only one through hole is shown in FIG. 1 as an example for explanation) is formed in a bottom portion of the frame 120 adapted to receive at least one electrical component 110 (only one electrical component is shown in FIG. 1 as an example for explanation) of the circuit board 100, and the heat conductive plate 200 is disposed on a side of the through hole 310. At least one optical film (not shown), a light guide plate (not shown) and a reflective sheet (not shown) are disposed between the frame 120 and the liquid crystal display unit 430, wherein the optical film, the light guide plate, and the reflective sheet are illustrated in FIG. 2A, FIG. 2B, FIG. 3A and FIG. 3B subsequently.

Hereinafter, FIG. 2A, FIG. 2B, FIG. 3A, FIG. 3B and FIG. 4 are used to explain the features of the present invention, the respective LCD structures shown therein are the cross-sectional diagrams similar to the one viewed from line A-A' shown in FIG. 1.

Figure 2A:
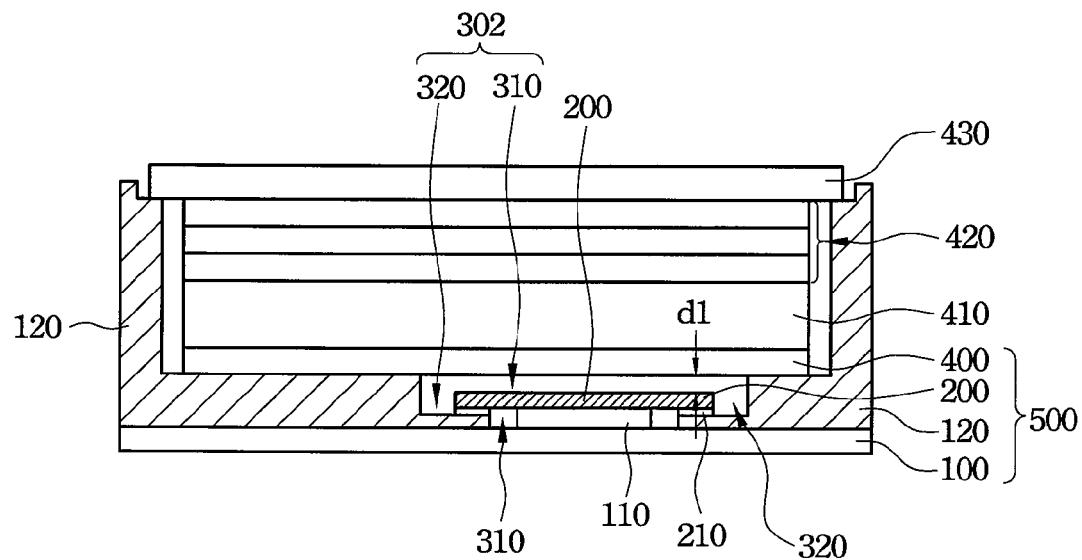
FIG. 2A and FIG. 2B are schematic diagrams illustrating LCD structures according to a first embodiment of the present invention, wherein the heat conductive plates are disposed via different methods, respectively.
Figure 2B:
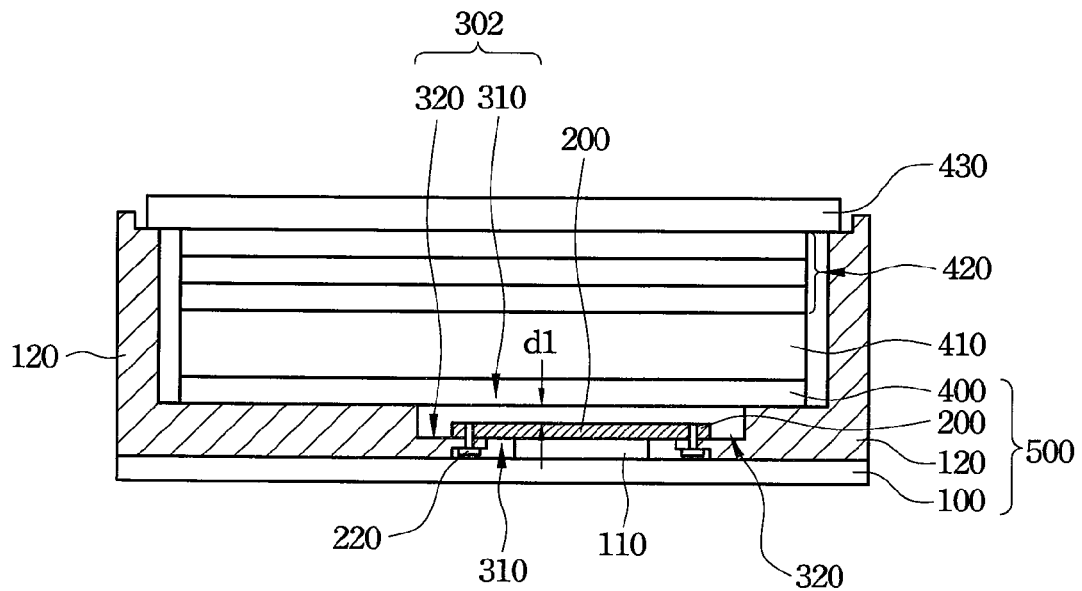

Referring to FIG. 2A and FIG. 2B, FIG. 2A and FIG. 2B are schematic diagrams illustrating LCD structures according to a first embodiment of the present invention, wherein the heat conductive plate is disposed via different methods, respectively. A backlight module 500 of the present invention comprises a circuit board 100, a frame 120, a first heat conductive plate 200, and a reflective sheet 400. A LCD of the present invention comprises the backlight module 500; a light guide plate 410 adjoining the reflective sheet 400; at least one optical film 420 disposed on the light guide plate 410; and a liquid crystal unit (panel) 430 disposed on the optical film 420. The frame 120 has a bottom portion (not labeled). The reflective sheet 400 is disposed on the inner surface of the bottom portion, and the surface of the reflective sheet 400 can be a substantially flat surface. In other words, the reflective sheet 400 is substantially flatly disposed on the substantially planar bottom surface. And a through hole 310 is formed in the bottom portion of the frame 120 adapted to receive at least one electrical component 110 (such as IC chip, capacitor, memory, others, or combinations thereof) of the circuit board 100, wherein the circuit board 100 (except the electrical component 110) is disposed on the outer surface of a portion of the frame 120. The circuit board 100, for example, has a base (not shown) and a plurality of wires in and/or on the base (not shown), and can be such as a rigid printed circuit board (such as a fiberglass PCB or another type) or a flexible PCB.

The present invention forms a recess portion 320 on the sidewall of the through hole 310, and thus the through hole with the recess portion 320 forms the so-called substantially step-typed through hole 302. Then, the heat conductive plate 200 is disposed on the top surface of the recess portion 320 of the substantially step-typed through hole 302, thereby uniformly distributing the high heat generated by the electrical component 110. With the configuration of the substantially step-typed through hole 302, the heat conductive plate 200 is naturally spaced from the reflective film 400 at a predetermined distance d1 (gap), thereby effectively preventing local wrinkles of the reflective sheet 400 caused by the temperature changes of the heat conductive plate 200, and also removing the trace left on the attached edge of the conventional heat conductive plate (since the heat conductive plate 200 of the present invention does not contact the reflective sheet 400).

As shown in FIG. 2A and FIG. 2B, according to the first embodiment, an opening area of the substantially step-typed through hole 302 adjacent to the reflective sheet 400 is substantially greater than other opening areas of the substantially step-typed through hole 302, i.e. the recess portion 320 is formed on one end of the through hole 310 near the reflective sheet 400. Further, as shown in FIG. 2A, the heat conductive plate 200 is fixed to the inner surface of the bottom portion of the frame 120 in the substantially step-typed through hole 302 via at least one adhesive element 210 (such as adhesive tapes, double-face adhesive tapes, adhesives, or other materials, but not limited thereto); and as shown in FIG. 2B, the heat-conductive plate 200 is fixed to the inner surface of the bottom portion of the frame 120 in the substantially step-typed through hole 302 via at least one fastening element 220 (such as screws, pins, bolts, rivets, or other elements, but not limited thereto). In FIG. 2B, screws are used as an example of the fastening elements 220, and are inserted from the outer surface of the frame 120 and pass through the heat-conductive plate 200 so as to fix the heat-conductive plate 200 to the inner surface of the bottom portion in the substantially step-typed through hole 302. However, the present invention is not limited thereto. The fastening elements 220 also may first pass through the heat-conductive plate 200 and then through the outer surface of the frame 120 so as to fix the heat-conductive plate 200 to the substantially step-typed through hole 302.

Figure 3A:
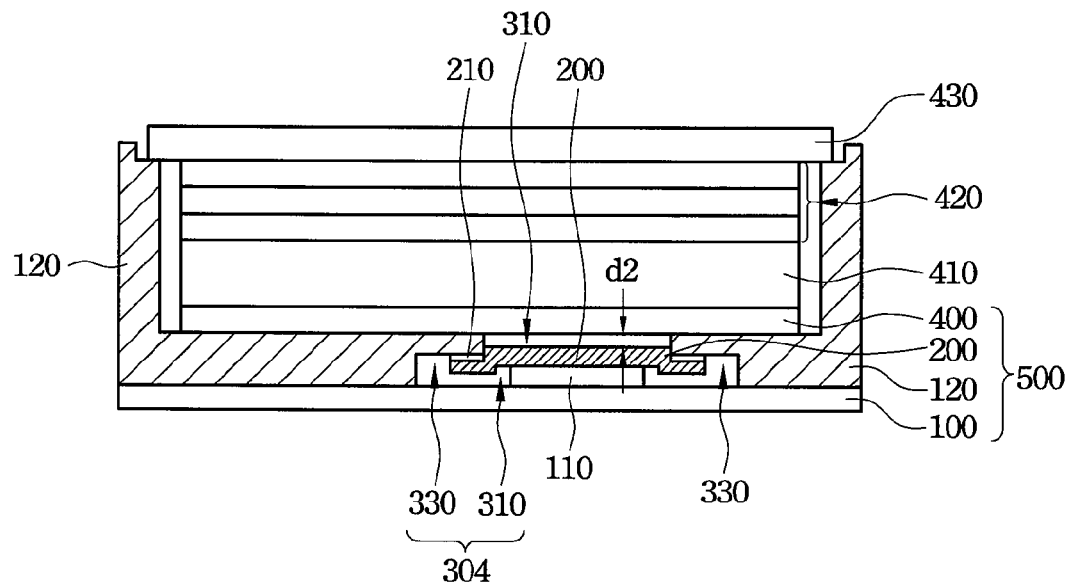
FIG. 3A and FIG. 3B are schematic diagrams illustrating LCD structures according to a second embodiment of the present invention, wherein the heat-conductive plates are disposed via different methods, respectively.
Figure 3B:
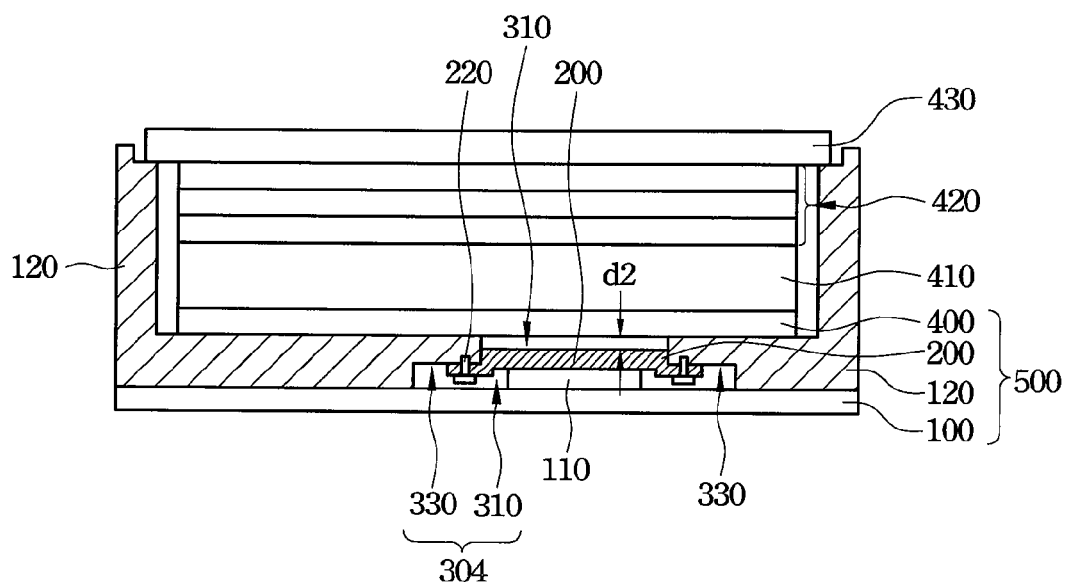

Referring to FIG. 3A and FIG. 3B, FIG. 3A and FIG. 3B are schematic diagrams illustrating LCD structures according to a second embodiment of the present invention, wherein the heat conductive plates are disposed via different methods, respectively. The difference between the first embodiment and the second embodiment is that: an opening area of the substantially step-typed through hole 304 adjacent to the reflective sheet 400 is substantially smaller than other opening areas of the substantially step-typed through hole 304, i.e. the recess portion 330 is formed on the other end of the through hole 310 substantially opposite to the reflective sheet 400, and the heat conductive plate 200 is spaced from the reflection film 400 at a predetermined distance d2 (gap). Further, as shown in FIG. 3A, the heat conductive plate 200 is fixed to the outer surface of the bottom portion of the frame 120 in the substantially step-typed through hole 304 via at least one adhesive element 210 (such as adhesive tapes, double-face adhesive tapes, adhesives, or other materials, but non-limited thereto); and as shown in FIG. 3B, the heat-conductive plate 200 is fixed to the outer surface of the bottom portion of the frame 120 in the substantially step-typed through hole 304 via at least one fastening element 220 (such as screws, pins, bolts, rivets, or other elements, but not limited thereto). The circuit board 100, for example, has a base (not shown) and a plurality of wires in and/or on the base (not shown), and can be such as a rigid printed circuit board (such as a fiberglass PCB or another type) or a flexible PCB.

In the first embodiment and the second embodiment of the present invention, the electrical component 110 is preferably in contact with the heat-conductive plate 200. However, the electrical component 110 also can be spaced from the heat-conductive plate 200 at a gap, i.e. does not contact the heat-conductive plate 200, and other forced convective heat-dissipation devices (not shown) also can be used together to enhance the heat-dissipation effect, such as fans, heat-conductive pipes or other elements.

Figure 4:
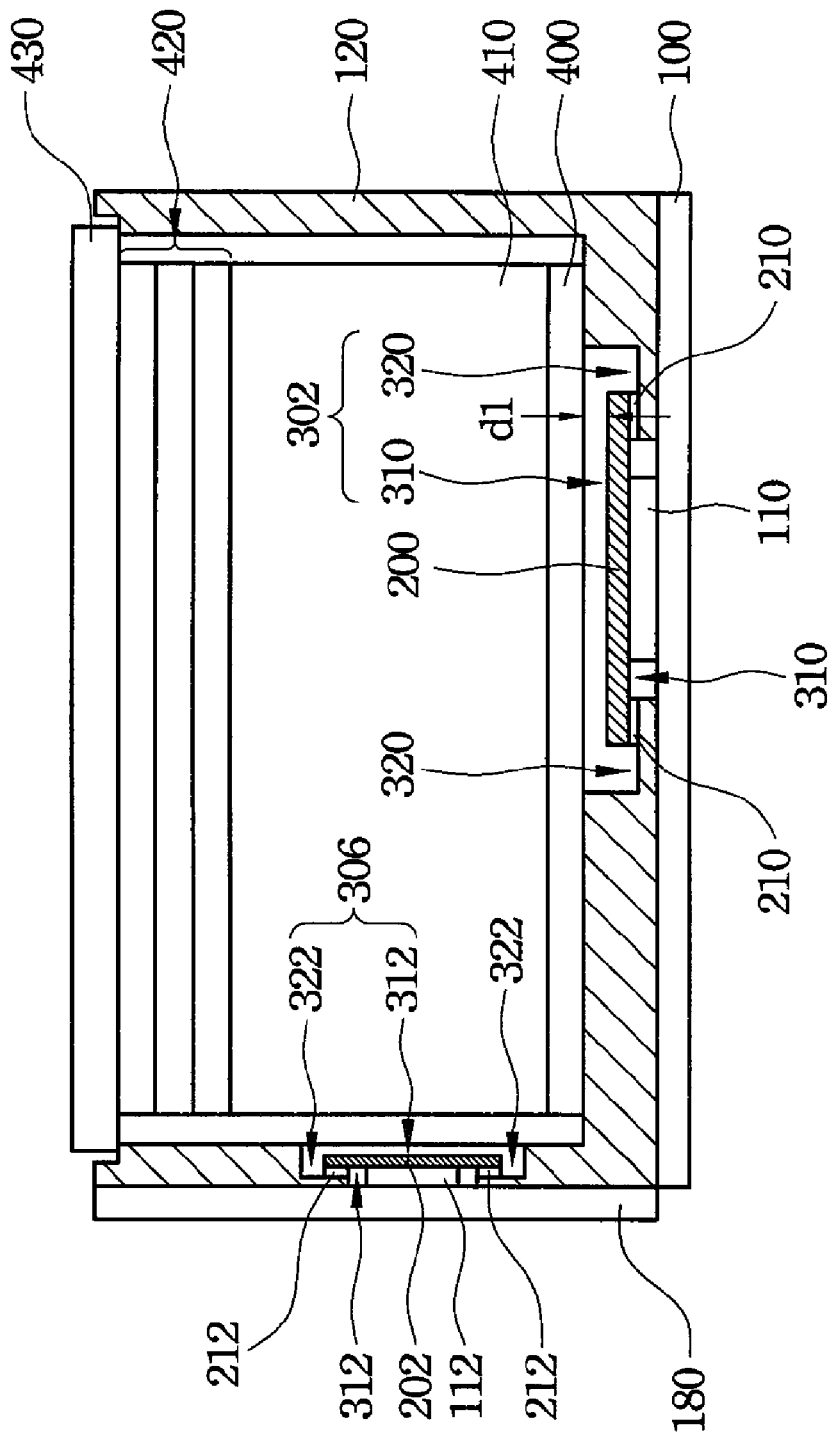
FIG. 4 is a schematic diagram illustrating a LCD structure according to a third embodiment of the present invention.

Referring to FIG. 4, FIG. 4 is a schematic diagram illustrating a LCD structure according to a third embodiment of the present invention. Under certain circumstances, one side (not labeled) of the frame 120 of the backlight module (not labeled) is also implemented with the circuit board 180. At this time, a through hole 312 is disposed on this side of the frame 120 adapted to receive at least one electrical component 112 of the circuit board 180. In the third embodiment, a heat conductive plate 202 is disposed between the through hole 312 and the electrical component 112, thereby uniformly distributing the high heat generated by the electrical component 112. The heat conductive plate 202 can be disposed on/directly disposed on the electrical component 112; or disposed on the through hole 312 via at least one adhesive element 212 or fastening element (not shown). The circuit boards 100 and 180, with a base (not shown) and a plurality of wires in and/or on the base (not shown), can be such as a rigid printed circuit board (such as a fiberglass PCB or another type) or a flexible PCB. In other words, all of the circuit boards are rigid printed circuit board, all of the circuit boards are flexible PCB, or one of the circuit boards is flexible PCB and another of the circuit boards is rigid printer circuit board.

Similarly, in the third embodiment, a recess portion 322 also can be formed on the sidewall of the through hole 312, thus forming a substantially step-typed through hole 306. Then, the heat conductive plate 202 is disposed on the top surface of the recess portion 322 of the substantially step-typed through hole 306. As shown in FIG. 4, an opening area of the substantially step-typed through hole 306 adjacent to the inner surface of the sidewall of the frame 120 is substantially greater than other opening areas of the substantially step-typed through hole 306. Further, according to another embodiment, the opening area of the substantially step-typed through hole 306 adjacent to the inner surface of the sidewall of the frame 120 is substantially smaller than the other opening areas of the substantially step-typed through hole 306.

It is worthy to be noted that the heat conductive plates 200 and 202 can be made of any heat conductive material, such as an aluminum foil, a gold foil, a copper foil, a silver foil, a thermal electric plate, or a combination thereof, but are not limited thereto. The embodiments of the present invention use the aluminum foil as an example. Further, in the third embodiment of the present invention, the electrical component 110 is preferably in contact with the heat-conductive plate 200, and the electrical component 112 is preferably in contact with the heat-conductive plate 202. However, the electrical components 110 and 112 also can be spaced from the heat-conductive plates 200 and 202 respectively at gaps, i.e. do not contact the heat-conductive plates 200 and 202 respectively, and other forced convective heat-dissipation devices (not shown) also can be used together to enhance the heat-dissipation effect, such as fans, heat-conductive pipes, or other elements. In the above embodiments of the present invention, only one through hole 310 and one through hole 312 are formed respectively on the bottom and side of the frame 120 as an example for explanation, but the present invention is not limited thereto. The bottom and side of the frame 120 each also can has a plurality of through holes, such as two, three, four, five through holes, etc.

Figure 5:
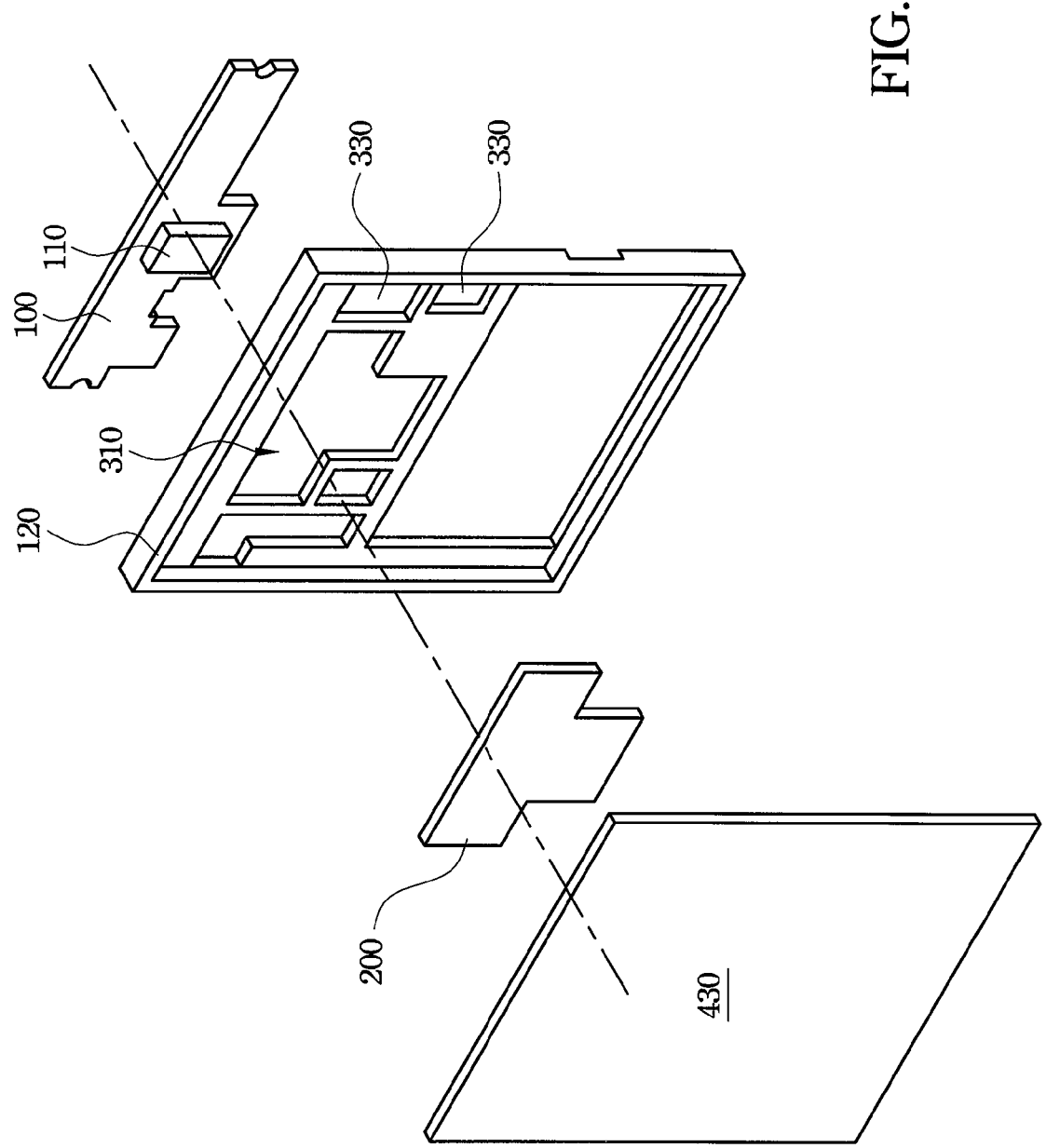
FIG. 5 is a schematic explosive diagram illustrating a LCD according to another embodiment of the present invention.

Referring to FIG. 5, FIG. 5 is a schematic explosive diagram illustrating a LCD according to another embodiment of the present invention, wherein the type of the substantially step-typed though hole is not specified, and the frame 120 has a plurality of through holes 310 and 330, such as five through holes. Not every through hole has at least one electrical component received therein, and it is based on the design requirements to selectively accommodate the electrical components or other elements in at least some of the through holes. It has to be indicated that, in the above embodiments of the present invention, at leas one of the circuit boards 100 and 180 (except the electrical components 110 and 112) are disposed on the entire outer surface of the bottom portion of the frame 120 as an example for explanation, but the present invention is not limited thereto. At least one of the circuit boards 100 and 180 also can be disposed on a portion of the outer surface of the bottom portion of the frame 120.

Moreover, the at least one optical film 420 shown in the above embodiments of the present invention comprise a polarizer, a light enhancement film, a prism, a transflective film, a diffusion sheet, or other types of films, or combinations thereof. The figures of the above embodiments of the present invention use three optical films as examples, but are not limited thereto. Further, the frame 120 shown in the above embodiments of the present invention can be made of metals, alloys, plastics, or combinations thereof. The present invention uses plastic material as examples, and thus the frame 120 is also called as a plastic frame, but is not limited thereto. Besides, the backlight module shown in the above embodiments of the present invention further comprises a light-emitting element (not shown), disposed on the reflective sheet.

Further, the liquid crystal display panel 430 of the LCD of the present invention comprises a multi-domain vertical alignment liquid crystal display panel (MVA-LCDP), a vertical alignment LCDP, a polymer stabilized alignment LCDP (PSA-LCDP), an in-plane switch LCDP (IPS-LCDP), an optically compensated bend LCDP (OCB-LCDP), a twisted nematic LCDP (TN-LCDP), a super twisted nematic LCDP (STN-LCDP), or others LCDP.

Figure 6:
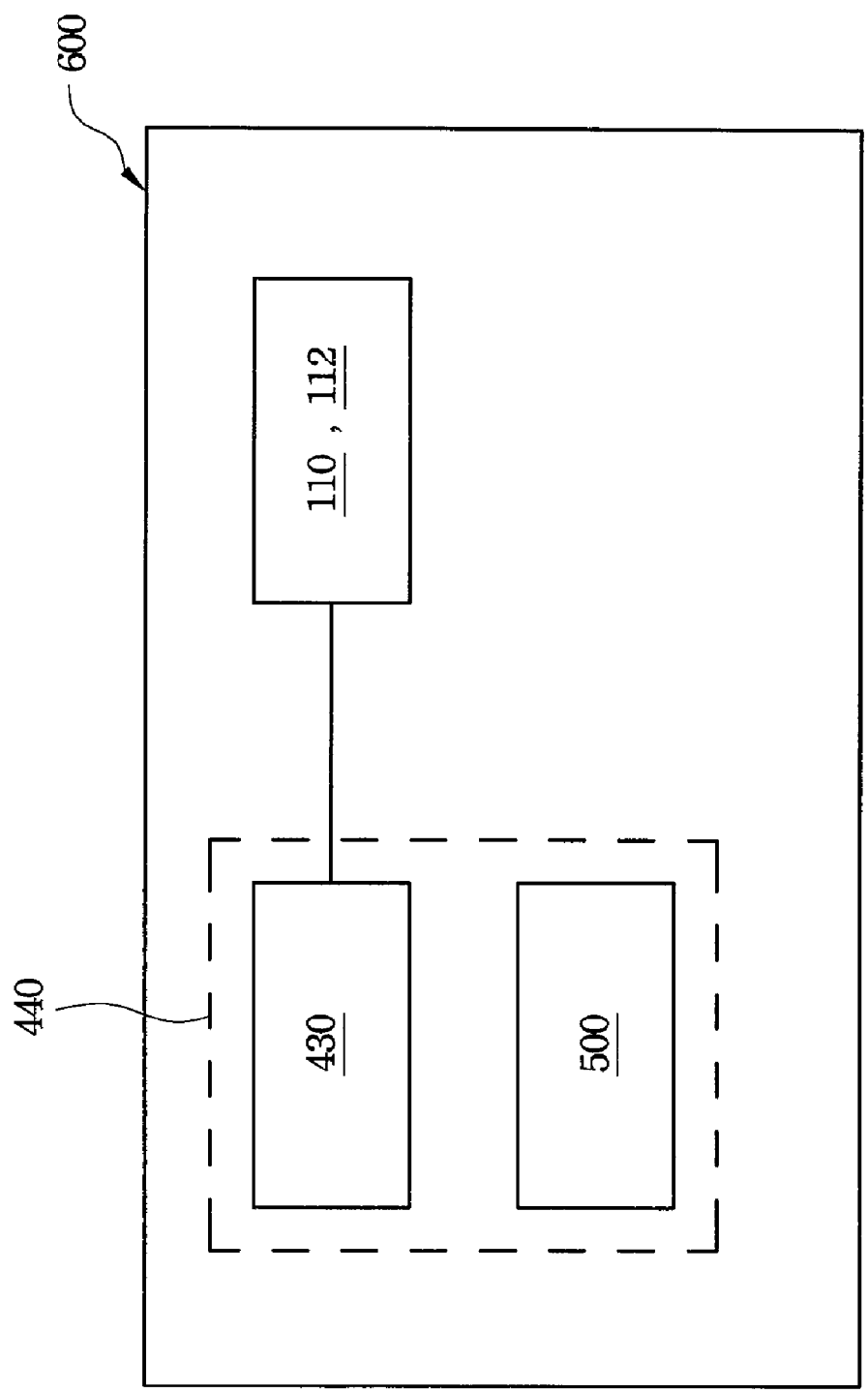
FIG. 6 is a schematic diagram illustrating an electro-optical apparatus of the present invention.

Referring to FIG. 6, FIG. 6 is a schematic diagram illustrating an electro-optical apparatus of the present invention. The LCD 440 and its backlight module 500 shown in the above embodiments of the present invention also can be applied in an electro-optical apparatus 600. The electro-optical apparatus 600 has the electrical components 110 and 112 connected to the liquid crystal display panel 430, and the electrical components 110 and 112 can be such as control elements, operation elements, processing elements, input elements, memory elements, driving elements, light-emitting elements (such as organic light-emitting diodes, inorganic light-emitting diodes, cold cathode fluorescent Lamps, hot cathode fluorescent Lamps, flat fluorescent lamps, external electrode fluorescent lamps, plasma lamps, or other types of lamps, or the combinations thereof), protection elements, or other functional elements, the combinations thereof. The electro-optical apparatus 600 includes portable products (such as cellular phones, video cameras, cameras, notebook computers, game boys, watchers, music players, email transceivers, digital photo frames, global positioning system (GPS) navigators, or other products), video/audio products (such as video/audio players or similar products), screens, TVs, indoor or outdoor billboards, etc.

It can be known from the embodiments described above, the present invention has the advantages of preventing the high heat generated by electrical components from affecting the liquid crystal unit (panel) 430; and preventing the temperature changes of the heat conductive plate from causing local wrinkles on the reflection sheet, and also removing the trace left on the attached edge of the conventional heat conductive plate, thus reducing the non-uniformity phenomenon of display.

While the present invention has been described by way of example and in terms of preferred embodiment, it is to be understood that the present invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A backlight module, comprising:
   a frame having a bottom portion and a first through hole formed in the bottom portion;
   a reflective sheet disposed on the inner surface of the bottom portion;
   a first heat conductive metal plate disposed in the first through hole, wherein the first heat conductive metal plate is spaced from the reflective sheet at a predetermined distance; and
   a first circuit board, disposed on the outer surface of a portion of the bottom portion, having at least one first electrical component received in the first through hole.

2. The backlight module of claim 1, wherein the first heat-conductive metal plate comprises an aluminum foil, a gold foil, a copper foil, a silver foil, a thermal electric plate, or combinations thereof.

3. The backlight module of claim 1, wherein an opening area of the first through hole adjacent to the reflective sheet is substantially larger than another opening area adjacent to the first circuit board.

4. The backlight module of claim 1, wherein an opening area of the first through hole adjacent to the reflective sheet is substantially smaller than another opening area adjacent to the first circuit board.

5. The backlight module of claim 1, wherein the first heat conductive metal plate is fixed to one surface of the bottom portion via an adhesive element.

6. The backlight module of claim 1, wherein the first heat conductive metal plate is fixed to one surface of the bottom portion via a fastening element.

7. The backlight module of claim 1, wherein the frame has a sidewall having a through hole, the backlight module further comprising:
   a second heat conductive plate disposed in the through hole of the sidewall; and
   a second circuit board, disposed on the outer surface of the sidewall, having at least one second electrical component received in the through hole.

8. The backlight module of claim 7, wherein an opening area of the through hole adjacent to the inner surface of the sidewall is substantially larger than another opening area adjacent to the second circuit board.

9. The backlight module of claim 7, wherein an opening area of the through hole adjacent to the inner surface of the sidewall is substantially smaller than another opening area adjacent to the second circuit board.

10. The backlight module of claim 7, wherein the second heat conductive plate comprises an aluminum foil, a gold foil, a copper foil, a silver foil, a thermal electric plate, or combinations thereof.

11. The backlight module of claim 7, wherein the second heat conductive plate is fixed to one surface of the sidewall via an adhesive element.

12. The backlight module of claim 7, wherein the second heat conductive plate is fixed to one surface of the bottom portion via a fastening element.

13. An electro-optical apparatus incorporating the backlight module of claim 1.

14. A liquid crystal display (LCD), comprising:
    a backlight module, comprising:
       a frame having a bottom portion and a first through hole formed in the bottom portion;
       a reflective sheet disposed on the inner surface of the bottom portion;
       a first heat conductive metal plate disposed in the first through hole, wherein the first heat conductive metal plate is spaced from the reflective sheet at a predetermined distance; and
       a first circuit board, disposed on the outer surface of a portion of the bottom portion, having at least one first electrical component received in the first through hole;
    a light guide plate adjoining the reflective sheet;
    at least one optical film disposed on the light guide plate; and
    a liquid crystal panel disposed on the optical film.

15. The LCD of claim 14, wherein the first heat-conductive metal plate comprises an aluminum foil, a gold foil, a copper foil, a silver foil, a thermal electric plate, or combinations thereof.

16. The LCD of claim 14, wherein an opening area of the first through hole adjacent to the reflective sheet is substantially larger than another opening area adjacent to the first circuit board.

17. The LCD of claim 14, wherein an opening area of the first through hole adjacent to the reflective sheet is substantially smaller than another opening area adjacent to the first circuit board.

18. The LCD of claim 14, wherein the first heat conductive metal plate is fixed to one surface of the bottom portion via an adhesive element.

19. The LCD of claim 14, wherein the first heat conductive metal plate is fixed to one surface of the bottom portion via a fastening element.

20. The LCD of claim 14, wherein the frame further has a sidewall having a through hole, the LCD further comprising:
    a second heat conductive plate disposed in the through hole of the sidewall; and
    a second circuit board, disposed on the outer surface of the sidewall, having at least one second electrical component received in the through hole.

21. The LCD of claim 20, wherein an opening area of the through hole adjacent to the inner surface of the sidewall is substantially larger than another opening area adjacent to the second circuit board.

22. The LCD of claim 20, wherein an opening area of the through hole adjacent to the inner surface of the sidewall is substantially smaller than another opening area adjacent to the second circuit board.

23. The LCD of claim 20, wherein the second heat conductive plate comprises an aluminum foil, a gold foil, a copper foil, a silver foil, a thermal electric plate, or combinations thereof.

24. The LCD of claim 20, wherein the second heat conductive plate is fixed to one surface of the sidewall via an adhesive element.

25. The LCD of claim 20, wherein the second heat conductive plate is fixed to one surface of the bottom portion via a fastening element.

26. An electro-optical apparatus incorporating the backlight module of claim 13.

27. A backlight module, comprising:
   a frame having a bottom portion and a plurality of first through holes formed in the bottom portion;
   a reflective sheet disposed in the inner surface of the bottom portion;
   a first heat conductive metal plate disposed in one of the first through holes, wherein the first heat conductive metal plate is spaced from the reflective sheet at a predetermined distance, and comprises an aluminum foil, a gold foil, a copper foil, a silver foil, a thermal electric plate, or combinations thereof; and
   at least one first circuit board, disposed on the outer surface of a portion of the bottom portion, having at least one first electrical component received in at least one of the first through holes.

28. The backlight module of claim 27, wherein the first heat conductive metal plate is fixed to one surface of the bottom portion via an adhesive element.

29. The backlight module of claim 27, wherein the first heat conductive metal plate is fixed to one surface of the bottom portion via a fastening element.

30. The backlight module of claim 27, wherein the frame further has a sidewall having at least one second through hole, the backlight module further comprising:
   a second heat conductive plate disposed in the second through hole of the sidewall; and
   a second circuit board, disposed on the outer surface of the sidewall, having at least one second electrical component received in the second through hole.

31. The backlight module of claim 30, wherein an opening area of at least one of the second through hole and one of the first through holes adjacent to the inner surface of the sidewall is substantially larger than another opening area adjacent to the second circuit board.

32. The backlight module of claim 30, wherein an opening area of at least one of the second through hole and one of the first through holes adjacent to the inner surface of the sidewall is substantially smaller than another opening area adjacent to the second circuit board.

33. The backlight module of claim 30, wherein the second heat conductive plate comprises an aluminum foil, a gold foil, a copper foil, a silver foil, a thermal electric plate, or combinations thereof.

34. The backlight module of claim 30, wherein the second heat conductive plate is fixed to one surface of the sidewall via an adhesive element.

35. The backlight module of claim 30, wherein the second heat conductive plate is fixed to one surface of the bottom portion via a fastening element.

36. An electro-optical apparatus incorporating the backlight module of claim 27.

* * * * *